Jan. 19, 1926. 1,569,991
T. LUND
MACHINE FOR USE IN THE MANUFACTURE OF SHOES
Filed Sept. 16, 1921 3 Sheets-Sheet 1

INVENTOR
Thomas Lund

Jan. 19, 1926. 1,569,991
T. LUND
MACHINE FOR USE IN THE MANUFACTURE OF SHOES
Filed Sept. 16, 1921 3 Sheets-Sheet 2

INVENTOR.
Thomas Lund

Patented Jan. 19, 1926.

1,569,991

UNITED STATES PATENT OFFICE.

THOMAS LUND, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR USE IN THE MANUFACTURE OF SHOES.

Application filed September 16, 1921. Serial No. 501,127.

*To all whom it may concern:*

Be it known that I, THOMAS LUND, a citizen of the United States, residing at Beverly, in the county of Essex and State of Massachusetts, have invented certain Improvements in Machines for Use in the Manufacture of Shoes, of which the following description, in connection with the accompanying drawings, is a specification, like reference characters on the drawings indicating like parts in the several figures.

This invention relates to machines for use in the manufacture of shoes, and is herein illustrated as embodied in a machine for channeling outer soles for McKay sewed shoes.

In preparing soles of this character, it is a common practice to throw the channel inward at the shank to provide a kind of extension edge which is useful during the making of the shoe but which is afterwards removed during trimming. In other cases the channel is thrown inwardly about the forepart of the sole to provide an extension edge. In both cases the change in the position of the channel may occur substantially at the ball line.

Heretofore, in operating on soles for McKay sewed shoes and other work requiring such variations in the positions of the tools performing channeling and analogous operations, the variations have been brought about under manual control, usually by moving an edge gage which determines the position of a piece of work with respect to the tool.

An object of the present invention is to provide, in a machine of the class described, improved mechanism for automatically controlling the action of the operating means. In one aspect, the invention is concerned with controlling such action according to a pattern or templet, which may be a part of the work, as in the case of soles provided with extra taps which usually terminate at the ball line (just where the variation in the position of the channel is desired). Viewed as an operation on a piece of work such as one of these tapped soles, a characteristic of which varies concomitantly with the desired variation in the operation to be performed thereon (as in the case of the tapped soles the variations in thickness occur at just the points where variations in the position of the channel are desired), the invention contemplates the use of means controlling such operation, and in turn controlled by the variations in such characteristic.

From the latter point of view a machine constructed according to my invention would comprise an instrumentality to operate on the work, and means arranged to measure variations in a characteristic of the work and vary the operation of such instrumentality according to such measurements. Each of the machines which are shown, for purposes of illustration, in the drawings, comprises a tool-carrying head which is moved vertically by variations in the thickness of the work, an edge gage which determines the position of the work, and a connection from the head to move the gage horizontally as the head moves vertically. By this arrangement, as the extra thickness of the tap is reached on one side of the sole, and as it is left on the opposite side, the position of the channel is changed automatically and with entire accuracy.

The invention also contemplates the use of a machine of this type for work which does not vary as explained, by adding to the work a separate pattern or templet in the nature of a temporary tap sole which supplies the necessary variations.

The above and other objects, and various improved parts and novel combinations, will be apparent from the following description of the illustrative machines shown in the accompanying drawings, in which—

Figure 1:
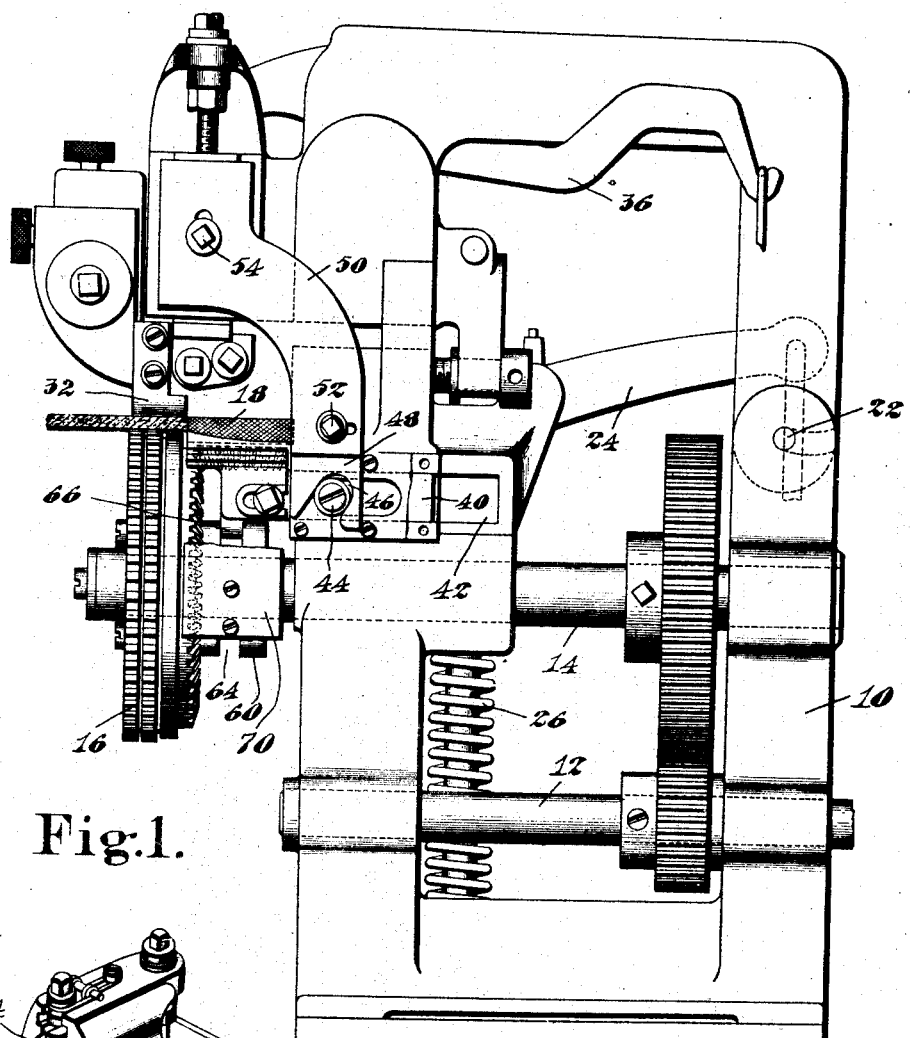
Fig. 1 is a side elevation of an illustrative machine.
Figure 2:
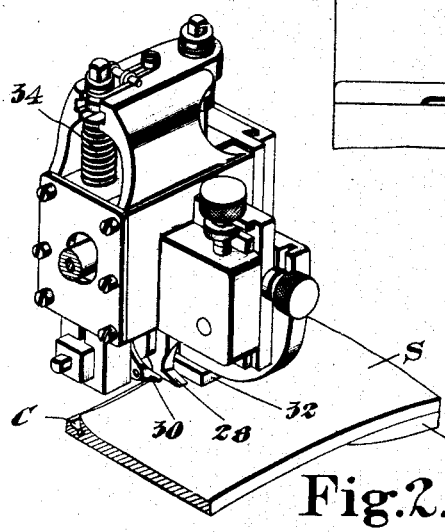
Fig. 2 is a perspective of the front of the tool carrier, with part of a sole in operative relation thereto except that the knives are shown outside of the channel.
Figure 3:
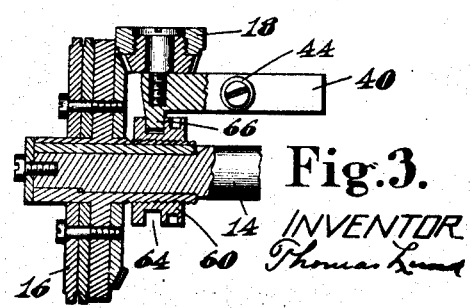
Fig. 3 is a section through the feed wheel and edge gage.

In the machine illustrated in the drawings, a frame 10 supports a power-rotated shaft 12 geared to a driven shaft 14 carrying a work-supporting feed wheel 16. An edge gage 18 is geared to the feed wheel 16, to be driven thereby at the same peripheral speed, to aid in feeding the work and to determine its lateral position.

A tool-carrying head 20 is pivotally mounted on frame 10 at 22, and a lever 24 is arranged to be rocked by a suitable treadle (not shown) to lift the head against the resistance of a spring 26 to permit insertion of the work. A channel knife 28 and a groover knife 30, together with a presser foot 32, are mounted on head 20, the groover knife being arranged to be raised independently of the channel knife against the resistance of a spring 34 by means of a treadle-operated lever 36.

The above-described elements may be, and are illustrated as being, substantially like the corresponding parts of the commercial machine known to those skilled in the shoemaking art as the "continuous-power Apex channeling machine," except as they are further described below.

Figure 6:
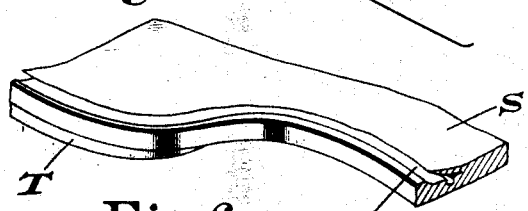
Fig. 6 is a perspective showing part of a sole channeled on the machine.

As previously explained, the illustrative machine shown in the drawings is according to the present invention arranged automatically to vary the relative positions of the channeling tools and the edge gage, in passing from the thick forward portion of a tapped sole to the thinner shank portion, in order to throw the channel inwardly of the sole at the shank (or the reverse in passing from the shank to the forward portion of the sole). The resulting channel is shown in Fig. 6.

Figure 4:
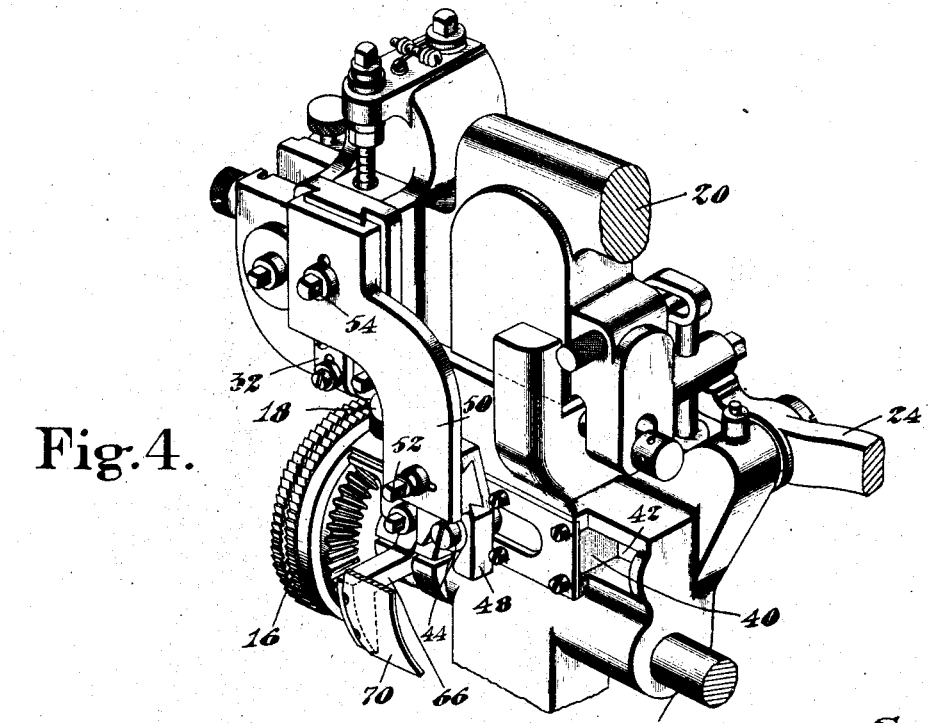
Fig. 4 is a perspective of the operative parts of the machine, looking in the opposite direction from Fig. 2.

In the machine shown in Figs. 1-5, the edge-gage 18 is mounted on a slide 40, movable laterally in a recess 42 in frame 10, and carrying a cam-roll 44 operated on by a cam slot 46 in cam member 48. Cam member 48, as shown in Fig. 4, is formed with a dove-tailed groove to be adjusted on an arm 50, and clamped in adjusted position by a clamp screw 52. This adjustment also permits ready exchange of interchangeable members 48 having cam slots of different shapes. In the same way the arm 50 is provided with a dove-tailed groove to be adjusted vertically on the head 20 and clamped thereto by a clamp-screw 54.

By this arrangement, vertical movement of the head 20, acting through the arm 50 and the cam member 48, moves the cam roll 44 (and therefore the gage 18) back and forth in a horizontal direction. As the presser foot 32 and the feed wheel 16 approach one another when the thinner shank is reached, the roll 44 is cammed backward, withdrawing the edge-gage and thereby throwing the channel inwardly of the sole. When the presser foot lifts the head 20 in passing from the shank on to the tapped forepart of a sole, the gage is advanced, throwing the channel toward the edge of the sole. This will be apparent from Fig. 6, showing a sole S, to which is secured a tap T, and a channel C running from the shank at the right to the forepart of the sole at the left.

Figures 5, 7:
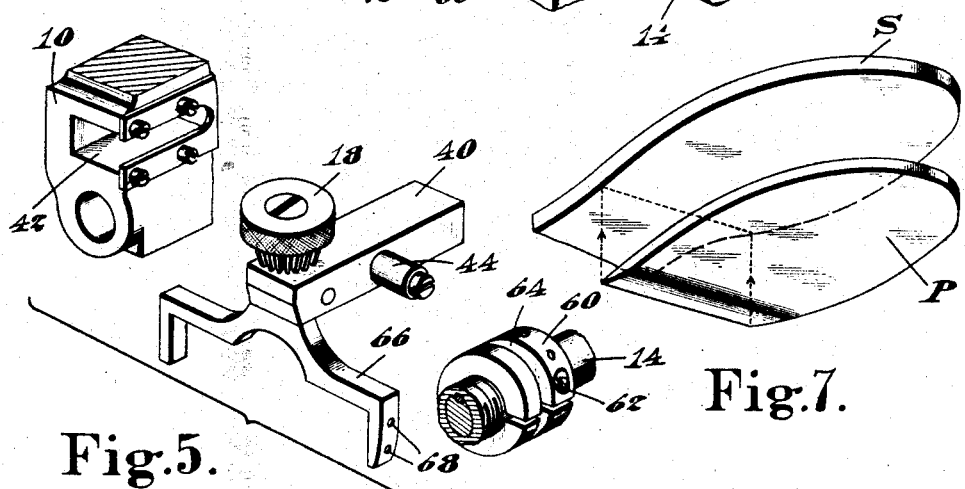
Fig. 5 is an exploded perspective view of the edge gage and associated parts.
Fig. 7 is a perspective showing the use of a temporary pattern or templet in channeling a sole of uniform thickness.

It is preferred to move the feed-wheel 16 with the gage 18, to avoid tearing the sole by dragging it across the teeth of the wheel, and to this end the shaft 14 is allowed a limited longitudinal "floating" movement, and is connected to the slide 40 to move therewith. As shown in Fig. 5, a split collar 60 is threaded on the shaft 14, for adjustment thereon, and is clamped thereto by a set screw 62. This collar is formed with an annular groove 64 in which there is seated a yoke 66 carried by the slide 40. Holes 68 are tapped in one end of the yoke, so that a guard 70 may be secured thereto.

Figure 8:
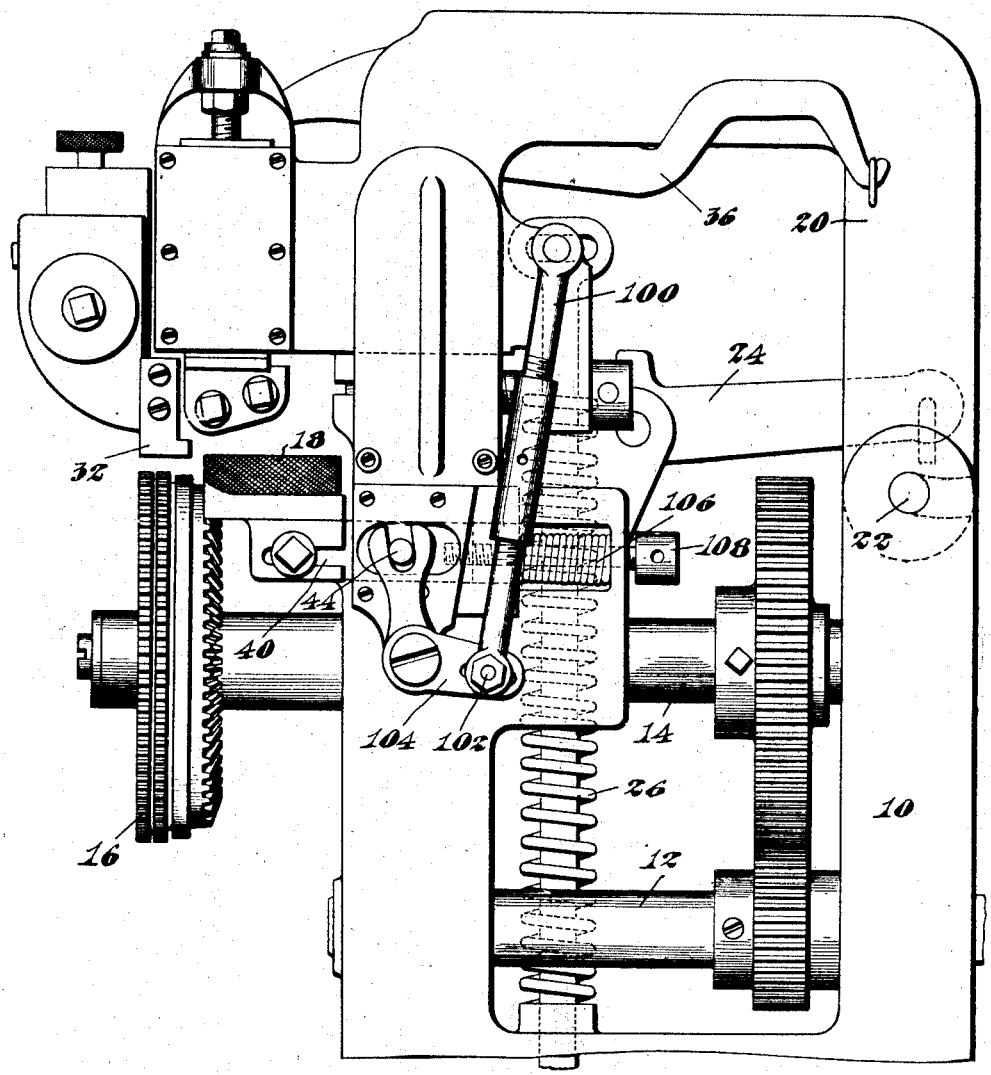
Fig. 8 is a side elevation of a modified form of machine.

In the modified form of machine shown in Fig. 8, the head 20 is connected to the gage 18 by an adjustable link 100, secured by a bolt-and-slot connection 102 to a bell-crank lever 104. The forked opposite end of the lever 104 engages the roll 44 on the slide 40 carrying the gage 18, and shifts the slide back and forth as the head moves up and down. If desired, a spring 106 may be arranged to urge the slide 40 outwardly; and, as is usual with machines of this type, the action of the spring 106 may be controlled by an adjustable stop 108. By adjusting the connection 102, the throw imparted to gage 18 by a given vertical movement of the head 20 may be varied.

In operation, a sole passed through either machine will be provided with a grooved channel which is nearer the sole margin about the forepart than in the shank. In order to channel soles of uniform thickness on a machine of this type, there may be employed a separate wooden or metal temporary tap sole P (Fig. 7) which may be regarded as a pattern or templet to control the operation of the machine.

While my invention has been described as embodied in a machine for channeling soles for McKay sewed shoes, it is not the intention to limit its scope thereby, since it is capable of embodiment in machines for performing other operations and for acting upon other kinds of work.

Having described my invention, what I claim as new and desire to secure by Letters Patent of the United States is:

1. A stock-treating machine comprising, in combination, means for progressively performing an operation continuously about a piece of stock, and means responsive to variation in a characteristic of the stock for controlling the location of the field of operations upon the stock.

2. A stock-treating machine comprising, in combination, an instrumentality continuously in engagement with a piece of stock and progressively operating thereon, means for measuring variation in characteristic of the stock, and connections controlled by the measurements so made for varying the location of the instrumentality inwardly with respect to the edge of the stock.

3. A machine of the class described comprising, in combination, an instrumentality progressively to operate on a piece of work, means to measure a characteristic of the work, and connections to vary the position on the surface of the work at which the instrumentality operates an amount which is proportional to variations in different measurements.

4. A stock-treating machine comprising, in combination, an instrumentality for progressively performing an operation upon a piece of stock and in continuous engagement therewith, and means automatically to vary the relation of said instrumentality to the edge of the stock in response to variations in a dimension of the stock.

5. A stock-treating machine comprising, in combination, a tool to operate progressively and continuously upon a piece of stock, means for measuring a dimension of the stock, and connections controlled by variations in different measurements made thereby for varying the position of the tool in a direction parallel to the surface of the stock.

6. A machine of the class described comprising, in combination, a tool to operate on a piece of stock, a gage for stock operated on thereby, means to measure a dimension of different parts of the stock, and a connection relatively to shift the tool and the stock in a direction parallel to the surface of the stock and in a degree proportionate to variations in different measurements.

7. A machine of the class described comprising, in combination, a gage to guide a piece of work in a curved path determined by its edge, and means to measure a dimension of different parts of the work and move the gage at right angles to the edge of the work in proportion to variations in the measurements.

8. A machine of the class described comprising, in combination, means for continuously feeding a piece of work, an instrumentality to operate on work fed thereby, and a connection responsive to variation in a characteristic of the stock for determining the location of the region operated upon.

9. A stock-treating machine comprising, in combination, means to operate progressively on a piece of stock, and means for relatively shifting the stock and said operating means in a direction parallel to the surface of the stock and in proportion to variations in a characteristic of the stock, said means being adjustable to vary the proportion.

10. A stock-treating machine comprising, in combination, an edge gage to position work, and means directly responsive to a characteristic of the work to vary the position of the gage in a direction perpendicular to the edge engaged by the gage.

11. A stock-treating machine comprising, in combination, a tool to operate on a piece of stock, an edge gage to position stock relatively thereto, and means directly and proportionately responsive to variations in a characteristic of the stock to vary the position of the tool with respect to the gage in a direction perpendicular to the edge engaged by the gage.

12. A stock-treating machine comprising, in combination, an instrumentality to operate on a piece of stock, and means immediately responsive to variations in thickness of the stock for changing the relative lateral positions of said instrumentality and the stock by relative rectilinear movement.

13. A stock-fitting machine comprising, in combination, a work support and a work engaging member co-operating to feed a sole, an edge gage to position a sole fed thereby, an instrumentality to operate on the sole, and connections to vary the relative positions of the edge gage and said instrumentality as the distance between the support and said member is changed by a variation in the thickness of the sole.

14. A machine for use in making shoes comprising, in combination, a work supporting feed wheel, a head carrying a tool and vertically movable relatively thereto and having a work engaging part which determines its vertical position, an edge gage to position work laterally on the feed wheel, and an arm connected to the head to vary the relative lateral positions of the gage and the tool as the head moves vertically.

15. A machine for use in making shoes comprising, in combination, a work supporting feed wheel, a tool carrying head vertically movable with respect thereto and having a work engaging part to determine its vertical position and also having a gage-operating part, and a slide carrying a gage to position work laterally of the feed wheel, said slide and the gage-operating part being connected so that vertical movement of the head causes lateral movement of the gage.

16. A machine for use in making shoes comprising, in combination, a work support, a tool carrying head movable relatively thereto, a gage to position work on the support, and an arm to transmit motion from the head to the gage to vary the relative positions of the gage and the head.

17. A machine for channeling tapped soles comprising, in combination, a channel knife, and means controlled by the tap on a sole automatically to vary the operation of the knife to throw the channel inwardly of the sole as the thin shank beyond the tap is reached.

18. A channeling machine comprising, in combination, a channel knife, an edge gage to position soles with respect thereto, and means to control the relative positions of the knife and the gage according to the thickness of the sole.

19. A channeling machine comprising, in combination, a sole support, a channel knife, a head carrying the knife and having a foot engaging the sole, an edge gage, and a device connecting the head and the gage to vary the lateral position of the gage according to the vertical position of the sole engaging foot.

20. A machine as defined by claim 19 which is adjustable to vary the lateral throw of the gage caused by a given vertical throw of the foot.

21. In a machine which has a sole supporting feed wheel, a head carrying a sole engaging presser foot and a stock fitting knife, an edge gage, and a slide to move the gage back and forth, the combination with the above-described elements of an arm connecting the head and the slide, so that vertical movement of the head will cause lateral movement of the gage.

22. Apparatus for use in making shoes comprising, in combination, means constructed and arranged for performing an operation on a sole of varying thickness and varying that operation according to the thickness of the sole, and a templet to be assembled on a sole of substantially uniform thickness temporarily to vary the combined thickness of the assembled sole and templet to provide for operating on the sole by said means.

23. That method of treating stock having a substantially uniform dimension in a machine constructed and arranged to operate on stock having the corresponding dimension variable which consists of assembling on such a piece of stock a templet so that the combined dimension of stock and templet will vary as required for stock to be operated on by the machine, and then feeding the assembled stock and templet to the machine.

24. A machine of the class described comprising, in combination, means to operate on a horizontal piece of stock, and a connection controlling said means and controlled by a vertically varying pattern on a horizontal surface of a substantially flat templet.

25. A channeling machine comprising, in combination, channel-cutting means, and means to control the position of a channel cut thereby in a direction perpendicular to variations in a pattern surface on a templet.

26. A machine for use in making shoes comprising, in combination, means to feed and operate on a piece of work, and means to control the operation according to a separate templet assembled against the work and which is fed through the machine at the same time as the work by engagement with a pattern on the surface of the templet opposite the work.

27. A machine for use in making shoes comprising, in combination, a tool, and means to feed an assembled sole and templet through the machine and control the operation of the tool according to a pattern on the side of the templet opposite the sole.

28. A machine for use in making shoes comprising, in combination, a tool, a gage, a templet, and means progressively to measure a dimension of the templet and relatively to shift the gage and tool according to the measurements so made.

29. A machine for operating on shoe soles comprising, in combination, a flap-forming cutter, sole positioning means, and connections including members to measure a dimension of a loose templet and relatively to shift the cutter and said means according to different measurements.

30. A stock-fitting machine comprising, in combination, a knife, a gage, and a connection to vary the relative positions of the knife and the gage according to a pattern on one side of a templet whose opposite side engages a piece of stock being operated on by the knife.

31. A machine for use in making shoes comprising, in combination, means to operate on a sole, a pattern, means to feed the pattern through the machine, a member moved by the pattern in a direction substantially perpendicular to the face of the sole, and connections between said member and the feed means to control the operation of said means according to the pattern.

32. A stock-treating machine comprising, in combination, an instrumentality progressively to operate upon a piece of stock, means continuously in engagement with the stock during the operation of said instrumentality thereon for measuring a characteristic of the stock, and means controlled by the measurement so made for changing the location of the instrumentality inwardly with respect to the edge of the stock.

In testimony whereof I have signed my name to this specification.

THOMAS LUND.